United States Patent
Hashimoto

(10) Patent No.: US 6,577,676 B1
(45) Date of Patent: Jun. 10, 2003

(54) DIGITAL MATCHED FILTER

(75) Inventor: Satoru Hashimoto, Kamakura (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/426,750

(22) Filed: Oct. 26, 1999

(30) Foreign Application Priority Data

Oct. 27, 1998 (JP) .......................................... 10-305551

(51) Int. Cl.$^7$ ......................... H04B 1/69; H04B 1/707; H04B 1/713
(52) U.S. Cl. ........................................ 375/152; 375/343
(58) Field of Search .............................. 375/152, 207, 375/208, 343; 370/208

(56) References Cited

U.S. PATENT DOCUMENTS 5,903,595 A * 5/1999 Suzuki .................... 375/152

FOREIGN PATENT DOCUMENTS

| EP | 0 874 471 A2 | 10/1999 |
| EP | 0 949 570 A1 | 10/1999 |
| EP | 0 973 272 A2 | 1/2000 |
| JP | 10-229378 | 8/1998 |

OTHER PUBLICATIONS

European Search Report dated Apr. 12, 2000.

* cited by examiner

Primary Examiner—Stephen Chin
Assistant Examiner—Curtis Odom
(74) Attorney, Agent, or Firm—Finnegan, Henderson, Farabow, Garrett & Dunner, L.L.P.

(57) ABSTRACT

A spread code shift controller circulates spread codes stored in coefficient registers and outputs the spread codes stored in a plurality of coefficient registers to a multiplier unit. A flag shift controller circulates one flag data on flag registers. As a result, flag data is sequentially input to receiving registers and a spread spectrum signal is stored for each data in the receiving registers. The spread spectrum signals stored in the receiving registers are input to corresponding multipliers and multiplied by the corresponding spread codes and the results of multiplication are added together in an adder unit to derive a correlation value.

17 Claims, 4 Drawing Sheets

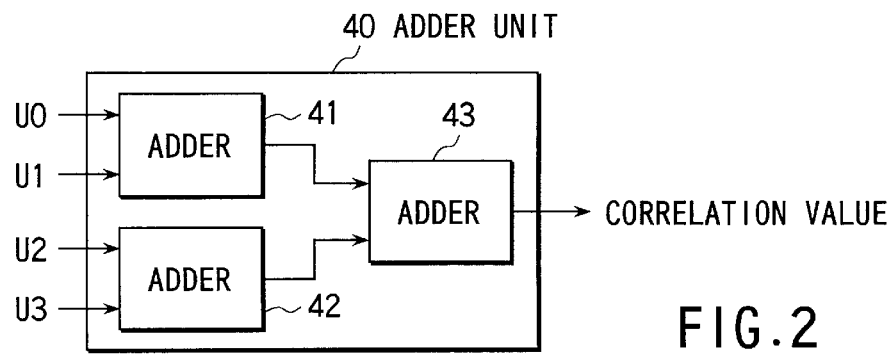
FIG. 2
| A | B | C | D |
|---|---|---|---|
| 1 | 0 | 1 | 1 |
FIG. 3
| A | B | C | D |
|---|---|---|---|
| 1 | X | X | 0 |
FIG. 5
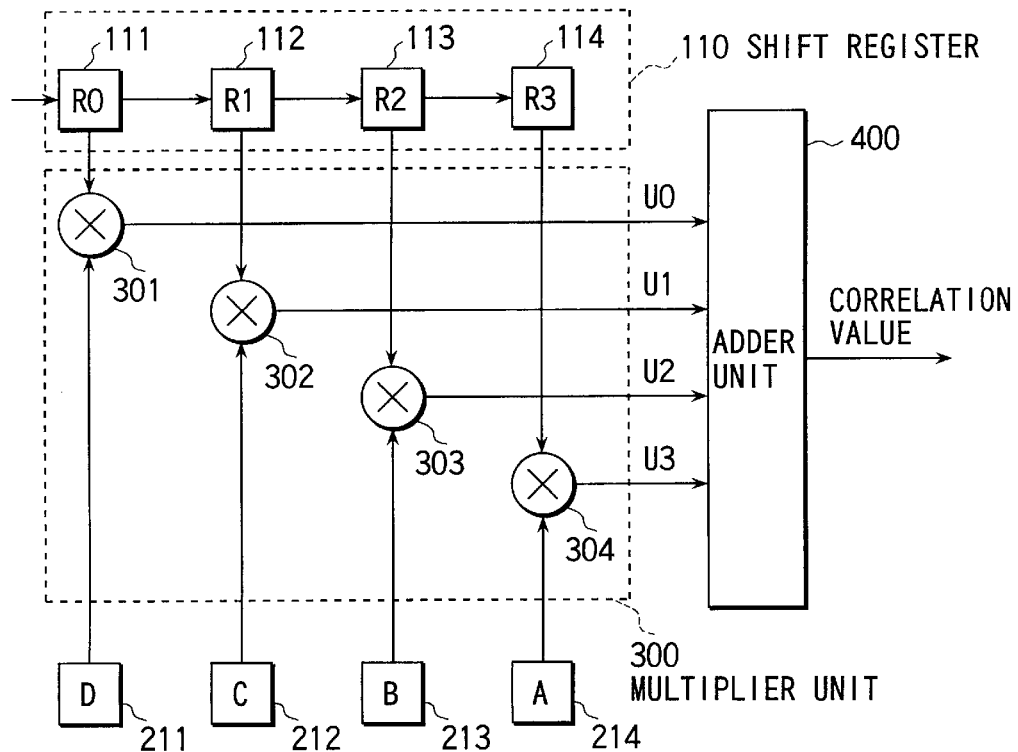
FIG. 7  PRIOR ART

| TIME | RECEIVING REGISTERS | | | | COEFFICIENT REGISTERS | FLAG REGISTERS | OUTPUTS OF MULTIPLIERS | | | | ADDITION RESULT (CORRELATION VALUE) |
|---|---|---|---|---|---|---|---|---|---|---|---|
| | R0 | R1 | R2 | R3 | D,C,B,A | F0,F1,F2,F3 | U0 | U1 | U2 | U3 | |
| INITIAL | 0 | 0 | 0 | 0 | 1,0,1,1 | 1,0,0,0 | 0 | 0 | 0 | 0 | 0 |
| 1 | 5 | 0 | 0 | 0 | 1,1,0,1 | 0,1,0,0 | 5 | 0 | 0 | 0 | 5 |
| 2 | 5 | 3 | 0 | 0 | 1,1,1,0 | 0,0,1,0 | 5 | 3 | 0 | 0 | 8 |
| 3 | 5 | 3 | 9 | 0 | 0,1,1,1 | 0,0,0,1 | -5 | 3 | 9 | 0 | 7 |
| 4 | 5 | 3 | 9 | 2 | 1,0,1,1 | 1,0,0,0 | 5 | -3 | 9 | 2 | 13 |
| 5 | 5 | 3 | 9 | 2 | 1,1,0,1 | 0,1,0,0 | 5 | 3 | -9 | 2 | 1 |
| 6 | 5 | 6 | 9 | 2 | 1,1,1,0 | 0,0,1,0 | 5 | 6 | 9 | -2 | 18 |
| 7 | 5 | 6 | 2 | 2 | 0,1,1,1 | 0,0,0,1 | -5 | 6 | 2 | 2 | 5 |
| 8 | 5 | 6 | 2 | 3 | 1,0,1,1 | 1,0,0,0 | 5 | -6 | 2 | 3 | 4 |
| 9 | 4 | 6 | 2 | 3 | 1,1,0,1 | 0,1,0,0 | 4 | 6 | -2 | 3 | 11 |

FIG. 4

| TIME | RECEIVING REGISTERS | | | | COEFFICIENT REGISTERS | FLAG REGISTERS | OUTPUTS OF MULTIPLIERS | | | | ADDITION RESULT (CORRELATION VALUE) |
|---|---|---|---|---|---|---|---|---|---|---|---|
| | R0 | R1 | R2 | R3 | D,C,B,A | F0,F1,F2,F3 | U0 | U1 | U2 | U3 | |
| INITIAL | 0 | 0 | 0 | 0 | 1,0,0,0 | 1,0,0,0 | 0 | 0 | 0 | 0 | 0 |
| 1 | 5 | 0 | 0 | 0 | 0,0,0,1 | 0,0,0,1 | -5 | 0 | 0 | 0 | -5 |
| 2 | 5 | 0 | 0 | 3 | 1,0,0,0 | 1,0,0,0 | 5 | 0 | 0 | -3 | 2 |
| 3 | 9 | 0 | 0 | 3 | 0,0,0,1 | 0,0,0,1 | -9 | 0 | 0 | 3 | -6 |
| 4 | 9 | 0 | 0 | 2 | 1,0,0,0 | 1,0,0,0 | 9 | 0 | 0 | -2 | 7 |
| 5 | 5 | 0 | 0 | 2 | 0,0,0,1 | 0,0,0,1 | -5 | 0 | 0 | 2 | -3 |
| 6 | 5 | 0 | 0 | 6 | 1,0,0,0 | 1,0,0,0 | 5 | 0 | 0 | -6 | -1 |
| 7 | 2 | 0 | 0 | 6 | 0,0,0,1 | 0,0,0,1 | -2 | 0 | 0 | 6 | 4 |
| 8 | 2 | 0 | 0 | 3 | 1,0,0,0 | 1,0,0,0 | 2 | 0 | 0 | -3 | -1 |
| 9 | 4 | 0 | 0 | 3 | 0,0,0,1 | 0,0,0,1 | -4 | 0 | 0 | 3 | -1 |

FIG.6

DIGITAL MATCHED FILTER

BACKGROUND OF THE INVENTION

This invention relates to a digital matched filter used in a receiver of CDMA (Code Division Multiple Access) system.

As is well known in the art, a digital matched filter is a filter for deriving the correlation between a received signal subjected to a spread spectrum process on the transmitter side and various types of spread codes.

FIG. 7 shows a conventional digital matched filter having a code length "4". The conventional digital matched filter includes a shift register 110, coefficient registers 211 to 214, multiplier unit 300 and adder unit 400.

The shift register 110 includes four receiving registers 111 to 114 and a spread spectrum signal converted into a digital signal by a preceding stage A/D converter (not shown) is input to and stored in the receiving register 111. Then, the spread spectrum signal stored in the receiving register 111 is sequentially shifted to the receiving registers 112, 113, 114 in response to a clock signal (not shown).

Further, each of the receiving registers 111 to 114 outputs the spread spectrum signal stored in response to the clock signal to the multiplier unit 300.

The coefficient registers 211 to 214 respectively store spread codes set by a controller (not shown) and outputs the stored spread codes to the multiplier unit 300 in response to the clock signal.

The multiplier unit 300 includes multipliers 301 to 304, and the multiplier 301 multiplies the spread spectrum signal input from the receiving register 111 by the spread code input from the coefficient register 211 and outputs the result U0 of multiplication to the adder unit 400.

Likewise, the multiplier 302 multiplies the spread spectrum signal from the receiving register 112 by the spread code from the coefficient register 212, the multiplier 303 multiplies the spread spectrum signal from the receiving register 113 by the spread code from the coefficient register 213, and the multiplier 304 multiplies the spread spectrum signal from the receiving register 114 by the spread code from the coefficient register 214, and the multipliers 302, 303, 304 respectively output the results U1, U2, U3 of multiplication to the adder unit 400.

The adder unit 400 adds together the multiplication results U0 and U1 and the multiplication results U2 and U3 and further adds together the results of addition. Then, the adder 400 outputs the addition result of the largest value among the finally obtained added values obtained at each preset time, that is, the largest correlation value to the controller. Thus, the controller recognizes that its own code is received when the largest correlation value appears. At this time, the controller sets the timing at which the code is detected in the finger of the receiver. As a result, the finger always receives a signal transmitted to itself at this timing.

In the conventional digital matched filter described above, since the contents of the shift register are changed in each cycle, an input to the multiplier is changed. On the other hand, the spread code from the coefficient register is kept unchanged. Therefore, the multiplication result of the multiplier is changed in each cycle and data input to the adder unit is also changed. The adder unit 400 effects the adding operation according to input data. In other words, the adder unit 400 effects the adding operation by selectively turning ON/OFF gates constructing the adders in response to an input signal, and as a result, power consumption occurs each time the gate is turned ON/OFF. That is, the gate is turned ON/OFF in each cycle and power consumption occurs.

Recently, in a mobile communication apparatus of a mobile communication system using the CDMA system, various studies and developments are made in order to reduce the power consumption thereof, extend the continuously serviceable time and make the battery size small. This also applies to the matched filter described above and the power saving thereof is strongly required.

BRIEF SUMMARY OF THE INVENTION

An object of this invention is to provide a digital matched filter capable of reducing power consumption.

Further, an object of this invention is to provide a digital matched filter capable of deriving correlation values with respect to a plurality of spread spectrum signals of different code lengths.

A digital matched filter according to this invention comprises a plurality of spread signal memories capable of storing received spread spectrum signals, a memory controller which causes the received spread spectrum signal to be stored into one of the plurality of spread signal memories according to a preset order, a shift register including a plurality of registers for storing the spread codes, for shifting the spread code between the registers, a plurality of multipliers each provided for one of the plurality of spread signal memories and one of the registers constructing the shift register, for multiplying the spread spectrum signal stored in a corresponding one of the spread signal memories by the spread code stored in a corresponding one of the registers, and a correlation unit which adds together the results of multiplication by the plurality of multipliers to derive the correlation between the received spread spectrum signal and the spread code stored in the shift register.

When the spread spectrum signal received from the communication destination is multiplied by the spread code in order to derive the correlation between the spread spectrum signal and the spread code, the digital matched filter causes the shift register to shift the spread code generally having a smaller amount of information than the spread spectrum signal and sequentially store the spread spectrum signal into the plurality of spread signal memories corresponding to the multipliers. Each of the multipliers multiplies the spread spectrum signal stored in a corresponding one of the spectrum signal memories by the spread code stored in a corresponding one of the registers of the shift register.

Therefore, according to the present digital matched filter, since a total variation amount of information stored in each register is smaller than in a case where the spread spectrum signal generally having a larger amount of information is shifted by the shift register and multiplied by the spread code, the number of ON/OFF operations of the gate constructing the digital matched filter can be reduced and the power consumption can be reduced.

Further, in order to attain the above object, in a digital matched filter according to this invention, the spread signal storage control unit causes data stored in each of a plurality of registers constructing a shift register and corresponding to a plurality of spread signal memories to output to a corresponding one of the spread signal memories. In other words, the spread signal storage control unit stores one flag data into the plurality of registers and shifts the flag data in a loop form between the registers to be output from the shift register to a corresponding one of the spread signal memories in response to the shifting operation of the shift register.

In a case where the received spread spectrum signal is input to the plurality of spread signal memories and flag data is input from a corresponding one of the registers of the spread signal storage controller, the plurality of spread signal memories store the spread spectrum signal and the shift register stores the spread code. The coefficient shift register includes a plurality of registers corresponding to a plurality of multipliers and shifts the spread code in a loop form between the plurality of registers. The shift controller variably controls the number of registers used in the loop shifting operation in the spread signal storage controller and the number of registers used in the loop shifting operation in the shift register according to the code length of the spread spectrum signal.

With the present digital matched filter, the number of registers used in the loop shifting operation in the spread signal storage controller and the number of registers used in the loop shifting operation in the shift register are variably controlled according to the code length of the spread spectrum signal. Therefore, according to the digital matched filter with the above construction, since multiplication of the spread spectrum signal by the spread code is made according to the code length, a correlation value with respect to the spread spectrum signal of a plurality of different code lengths can be derived.

Additional objects and advantages of the invention will be set forth in the description which follows and in part of will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detail description of the preferred embodiments given below, serve to explain the principles of the invention.

FIG. 2 is a block diagram showing the construction of an adder unit of the digital matched filter shown in FIG. 1;

FIG. 3 is a diagram showing a spread code previously set into each coefficient register of the digital matched filter shown in FIG. 1 when the code length is "4";

FIG. 4 is a diagram for illustrating transition of data stored into each register of the digital matched filter shown in FIG. 1 when the code length is "4";

FIG. 5 is a diagram showing a spread code previously set into each coefficient register of the digital matched filter shown in FIG. 1 when the code length is "2";

FIG. 6 is a diagram for illustrating transition of data stored into each register of the digital matched filter shown in FIG. 1 when the code length is "2"; and FIG. 7 is a block diagram showing the construction of a conventional digital matched filter.

DETAILED DESCRIPTION OF THE INVENTION

Figure 1:
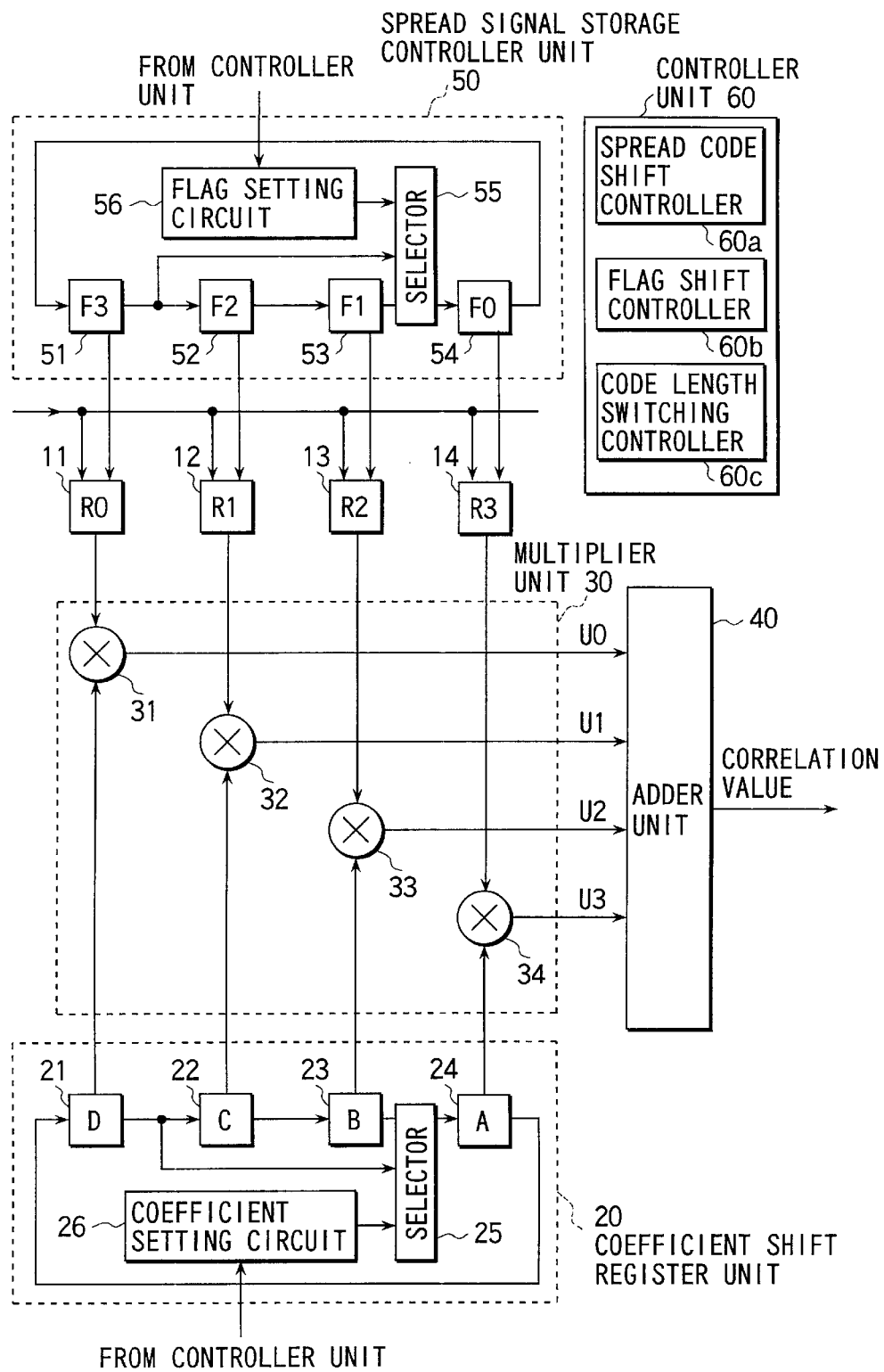
FIG. 1 is a block diagram showing the construction of one embodiment of a digital matched filter according to this invention.

There will now be described an embodiment of this invention with reference to the accompanying drawings.

FIG. 1 shows the construction of a digital matched filter according to one embodiment of this invention. The digital matched filter includes receiving registers 11 to 14, coefficient shift register unit 20, multiplier unit 30, adder unit 40, spread signal storage controller unit 50 and controller unit 60.

The receiving registers 11 to 14 are each supplied with a spread spectrum signal which is received from the communication destination and converted into a digital signal, store the spread spectrum signal only when flag data "1" is input from the spread signal storage controller unit 50 which will be described later and then output the stored spread spectrum signal to the multiplier unit 30 in response to a clock signal (not shown).

The coefficient shift register unit 20 includes coefficient registers 21 to 24, selector 25 and coefficient setting circuit 26. The coefficient setting circuit 26 creates a spread code in response to an instruction from the controller unit 60 and outputs the same to the selector 25.

The coefficient registers 21 to 24 respectively output data items stored therein to multipliers 31 to 34 of the multiplier unit 30 in response to the clock signal and constitute a ring shift register for shifting data in an order of the coefficient registers 21, 22, 23, 24 and 21 again.

The selector 25 is connected between the coefficient registers 23 and 24. The selector 25 selects one of the spread code created by the coefficient setting circuit 26, data output from the coefficient register 21 and data output from the coefficient register 23 and outputs the selected signal or data to the coefficient register 24.

The multiplier unit 30 includes the multipliers 31 to 34. The multiplier 31 multiplies the spread spectrum signal from the receiving register 11 by the spread code from the coefficient register 21 and outputs the result U0 of multiplication to the adder unit 40.

Likewise, the multiplier 32 multiplies the spread spectrum signal from the receiving register 12 by the spread code from the coefficient register 22, the multiplier 33 multiplies the spread spectrum signal from the receiving register 13 by the spread code from the coefficient register 23, and the multiplier 34 multiplies the spread spectrum signal from the receiving register 14 by the spread code from the coefficient register 24 and the multipliers 32, 33 and 34 respectively output the results U1, U2 and U3 of multiplication to the adder unit 40.

For example, as shown in FIG. 2, the adder unit 40 includes three adders 41 to 43. The adder 41 adds together the multiplication results U0 and U1 and the adder 42 adds together the multiplication results U2 and U3. The adder 43 adds together the addition results of the adders 41 and 42 and outputs the addition result to the controller unit 60 as a correlation value.

The spread signal storage controller unit 50 includes flag registers 51 to 54, selector 55 and flag setting circuit 56. The flag setting circuit 56 creates data "0" or data "1" as flag data in response to an instruction from the controller unit 60 and outputs the data to the selector 55.

The flag registers 51 to 54 respectively output data items stored in response to the clock signal to the receiving registers 11 to 14 and constitute a ring shift register for shifting data in an order of the registers 51, 52, 53, 54 and 51 again.

The selector 55 is connected between the flag registers 53 and 54. The selector 55 selects one of data created by the flag setting circuit 56, data output from the flag register 51 and data output from the flag register 53 and outputs the selected data to the flag register 54.

The controller unit 60 generally controls the units of the digital matched filter and, for example, gives an instruction to the coefficient setting circuit 26 to sequentially create various spread codes in a preset cycle.

Further, the controller unit 60 includes a spread code shift controller 60a, flag shift controller 60b and code length switching controller 60c.

The spread code shift controller 60a controls the selecting state of the selector 25, permits the spread code created by the coefficient setting circuit 26 to be input to the coefficient register 24, supplies the clock signal to the coefficient shift register unit 20 so as to circulate the spread codes stored in the coefficient registers 21 to 24 and permits the spread codes stored in the coefficient registers 21 to 24 to be output to the multiplier unit 30.

The flag shift controller 60b controls the selecting state of the selector 55, permits data created by the flag setting circuit 56 to be input to the flag register 54, supplies the clock signal to the flag registers 51 to 54 so as to circulate flag data "1" via the flag registers 51 to 54 and permits the flag data to be sequentially output to the receiving registers 11 to 14.

The code length switching controller 60c controls the selecting states of the selectors 25 and 55 when the code length of the received spread spectrum signal is changed.

Next, the operation of the digital matched filter with the above construction is explained. First, the operation effected when the code length of the spread spectrum signal is "4" is explained.

First, in the initial period of the operation, the spread code shift controller 60a controls the selecting state of the selector 25 in order to previously set a spread code as shown in FIG. 3, for example, into the coefficient registers 21 to 24 and permits the spread code created by the coefficient setting circuit 26 to be input to the coefficient register 24.

In the following description, it is supposed that R0, R1, R2 and R3 denote spread spectrum signals stored in the receiving registers 11 to 14, A, B, C and D denote spread codes stored in the coefficient registers 24, 23, 22 and 21, and F0, F1, F2 and F3 denote data items stored in the flag registers 54, 53, 52 and 51.

The flag shift controller 60b controls the selecting state of the selector 55 in order to previously set flag data items in the flag registers 51 to 54 and permits data created by the flag setting circuit 56 to be input to the flag register 54.

By the above initial operation, data items indicated by the column "initial" in FIG. 4 are stored (previously set) in the receiving registers 11 to 14, coefficient registers 21 to 24 and flag registers 51 to 54.

When data items are thus previously set in the above registers, the code length switching controller 60c controls the selecting state of the selector 25 so as to permit an output of the coefficient register 23 to be input to the coefficient register 24 and permit an output of the flag register 53 to be input to the flag register 54 since the code length is "4". After this, in order to examine the correlation between the received spread spectrum signal and the spread code, the spread code shift controller 60a supplies the clock signal to the coefficient shift register unit 20 so as to permit the spread codes stored in the coefficient registers 21 to 24 to be circulated (refer to the column of the coefficient register in FIG. 4) and permit the spread codes stored in the coefficient registers 21 to 24 to be output to the multiplier unit 30.

The flag shift controller 60b supplies the clock signal to the flag registers 51 to 54 so as to permit flag data "1" to be circulated via the flag registers 51 to 54 (refer to the column of the flag register in FIG. 4). Thus, flag data "1" is sequentially input to the receiving registers 11 to 14 and, as a result, the spread spectrum signal is sequentially stored into the receiving registers 11 to 14 for each data (refer to the column of the receiving register in FIG. 4).

The spread spectrum signals stored in the receiving registers 11 to 14 are respectively input to the multipliers 31 to 34 in synchronism with the clock signal and multiplied by the respective spread codes and the multiplication results as shown by the outputs U0 to U3 of the multipliers in FIG. 4 can be obtained. The outputs U0 to U3 of the multipliers are added together by the adder unit 40 to derive a correlation value. In this case, in the adder unit 40, the correlation value is compared with a threshold value and a correlation value which is larger than the threshold value, for example, a correlation value 18 in the case of FIG. 4 is supplied to the controller unit 60. The controller unit 60 recognizes that its own code is received when the largest correlation value 18 appears. At this time, the controller unit sets the timing at which the code is detected in the finger of the receiver. As a result, the finger always receives a signal transmitted to itself at this timing.

Next, the operation effected when the code length of the spread spectrum signal is "2" is explained.

First, in the initial period of the operation, the spread code shift controller 60a controls the selecting state of the selector 25 in order to previously set a spread code as shown in FIG. 5, for example, into the coefficient registers 21 to 24 and permits the spread code created by the coefficient setting circuit 26 to be input to the coefficient register 24.

On the other hand, the flag shift controller 60b controls the selecting state of the selector 55 in order to previously set flag data items in the flag registers 51 to 54 and permits data created by the flag setting circuit 56 to be input to the flag register 54.

By the above initial operation, respective data items indicated in the column "initial" in FIG. 6 are stored (previously set) in the receiving registers 11 to 14, coefficient registers 21 to 24 and flag registers 51 to 54.

When data items are thus previously set in the above registers, the code length switching controller 60c controls the selecting state of the selector 25 so as to permit an output of the coefficient register 21 to be input to the coefficient register 24 and permit an output of the flag register 51 to be input to the flag register 54 since the code length is "2". At this time, "0" data items previously set in the coefficient registers 22 and 23 and the flag registers 52 and 53 are not updated.

After this, in order to examine the correlation between the received spread spectrum signal and the spread code, the spread code shift controller 60a supplies the clock signal to the coefficient shift register unit 20 so as to permit the stored spread code to be circulated between the coefficient registers 21 and 24 (refer to the column of the coefficient register in FIG. 6) and permit the spread codes stored in the coefficient registers 21 to 24 to be output to the multiplier unit 30.

The flag shift controller 60b supplies the clock signal to the flag registers 51 to 54 so as to permit flag data "1" to be circulated between the flag registers 51 and 54 (refer to the column of the flag register in FIG. 6). Thus, flag data "1" is alternately input to the receiving registers 11 and 14. The spread spectrum signal is sequentially stored into the receiving registers 11 and 14 for each data (refer to the column of the receiving register in FIG. 6).

The spread spectrum signals stored in the receiving registers 11 to 14 are respectively input to the multipliers 31 to 34 in synchronism with the clock signal and multiplied by the respective spread codes and the multiplication results as shown by the outputs U0 to U3 of the multipliers in FIG. 6 can be obtained. The outputs U0 to U3 of the multipliers are added together by the adder unit 40 to derive a correlation value.

As described above, in the digital matched filter with the above construction, the spread code represented by one bit is circulated in the coefficient registers 21 to 24 constructing the ring shift register so as to permit the circulated spread codes to be output to the multipliers 31 to 34. The spread signal storage controller unit 50 sequentially stores a spread spectrum signal which is normally represented by approx. five bits into the receiving registers 11 to 14 corresponding to the multipliers 31 to 34 and then causes the spread spectrum signals to be output to the multipliers 31 to 34. That is, in the digital matched filter with the above construction, instead of shifting a spread spectrum signal having a large information amount between the registers and outputting the spread spectrum signals to the multipliers 31 to 34, the spread spectrum signals stored into the receiving registers 11 to 14 are output to the multipliers 31 to 34 while the oldest one of the spread spectrum signals stored in the receiving registers 11 to 14 is sequentially replaced by a new spread spectrum signal and a spread code having a small information amount is circulated (shifted) and output to the multipliers 31 to 34 so as to derive a correlation value. Therefore, according to the digital matched filter with the above construction, since the total variation amount of information stored in each register is smaller than in a case where the spread code having a small information amount is fixedly input to a corresponding multiplier and the spread spectrum signal having a large amount of information is shifted as in the prior art case, the number of gate operations of the gates constructing the digital matched filter can be reduced and, as a result, the power consumption can be reduced.

Further, in the digital matched filter with the above construction, if the correlation value of the spread spectrum signal whose code length is "2" and is smaller than the number "4" of registers (11 to 14, 21 to 24, 51 to 54) provided therein is examined, the multiplying operation is effected to derive a correlation value while the above shifting operation and the input operation of the spread spectrum signal are effected only for the registers (11, 14, 21, 24, 51, 54) corresponding to the code length and "0" is stored in the remaining registers (12, 13, 22, 23, 52, 53). Therefore, according to the digital matched filter with the above construction, since the outputs U1 and U2 from the multipliers 32 and 33 which are not associated with the calculation for the correlation value become "0", the correlation value can be derived even when the code length is "2".

This invention is not limited to the above embodiment. For example, a case wherein the code length is set to "4" and "2" is explained in the above embodiment, but if the code length is longer than the above value, the digital matched filter can be realized by using registers, multipliers and adders as required to constitute a redundancy construction and, in this case, the same effect can be attained.

As described above, in this invention, when the spread spectrum signal received from the communication destination is multiplied by the spread code in order to derive the correlation between the spread spectrum signal and the spread code, the shift register is caused to shift the spread code generally having a smaller amount of information than the spread spectrum signal and the spread spectrum signal is sequentially stored into the plurality of spread signal memories corresponding to the multipliers and each of the multipliers multiplies the spread spectrum signal stored in a corresponding one of the spectrum signal memories by the spread code stored in a corresponding one of the registers of the shift register. Therefore, according to this invention, a digital matched filter can be provided which can reduce the number of ON/OFF operations of the gate constructing the digital matched filter and consequently reduce the power consumption since a total variation amount of information stored in each register is smaller than in a case where the spread spectrum signal generally having a larger amount of information is shifted by the shift register and multiplied by the spread code.

Further, in this invention, the number of registers used in the loop shifting operation in the spread signal storage controller and the number of registers used in the loop shifting operation in the shift register are variably controlled according to the code length of the spread spectrum signal. Therefore, according to the digital matched filter with the above construction, since multiplication of the spread spectrum signal by the spread code is made according to the code length, correlation values for spread spectrum signals of a plurality of different code lengths can be derived.

Additional advantages and modifications will readily occur to those skilled in the art in the art. Therefore, the invention in its broader aspects is not limited to the specific details and representative embodiments shown described herein. Accordingly, various modifications may be made without departing from the spirit or scope of the general inventive concept as defined by the appended claims and their equivalents.

What is claimed is:

1. A digital matched filter comprising:
  a plurality of spread signal memories each capable of storing a received spread spectrum signal;
  a spread signal storage controller including a plurality of flag registers which store flag data, and configured to shift the flat data while selectively skipping at least one of the flag registers in accordance with a code length of the spread spectrum signal and store the received spread spectrum signal into one of said plurality of spread signal memories;
  a spread code shift register including a plurality of code registers which store spread codes, and configured to shift the flag data while selectively skipping at least one of the code registers in accordance with a code length of the spread spectrum signal;
  a plurality of multipliers corresponding to said plurality of spread signal memories and said plurality of code registers of said spread code shift register, said plurality of multipliers multiplying the spread spectrum signals stored in said spread signal memories by the spread codes stored in said code registers, and
  an adder unit which adds together the results of multiplication by said plurality of multipliers and deriving the correlation between the received spread spectrum signal and the spread code stored in said shift register.

2. The digital matched filter according to claim 1, wherein said spread signal storage controller includes a flag shift register which has a plurality of flag registers corresponding to said plurality of spread signal memories, said storage controller storing one flag data into said plurality of flag registers and shifting the flag data in a loop form between said flag registers and outputting the flag data stored in said flag shift register to a corresponding one of said spread signal memories in response to the shifting operation of said flag shift register, and said plurality of spread signal memories are supplied with the received spread spectrum signals and store the spread spectrum signal when flag data is input from a corresponding one of the flag registers of said spread signal storage controller.

3. The digital matched filter according to claim 1, wherein said plurality of code registers are respectively connected to said plurality of multipliers and make up a ring shift register for shifting the spread code in a loop form between said plurality of code registers.

4. The digital matched filter according to claim 1, wherein said spread signal storage controller includes a ring shift register which has a plurality of flag registers corresponding to said plurality of spread signal memories, said ring shift register storing one flag data into said plurality of flag registers and shifting the flag data in a loop form between said flag registers and outputting data stored in each of said flag registers to a corresponding one said spread signal memories in response to the shifting operation of said ring shift register, said plurality of spread signal memories store the spread spectrum signal when flag data is input from a corresponding one of the flag registers, said plurality of code registers are respectively connected to said plurality of multipliers and shift the spread code in a loop form between said plurality of code registers, and which further includes a shift controller for variably controlling the number of flag registers used in the loop shifting operation in said spread signal storage controller and the number of code registers used in the loop shifting operation in said code register according to the code length of the spread spectrum signal.

5. The digital matched filter according to claim 1, wherein said plurality of spread signal memories store the spread spectrum signal and output the stored spread spectrum signal to said multiplier unit only when flag data "1" is input from said spread signal storage controller.

6. The digital matched filter according to claim 1, wherein said spread code shift register includes first stage to final stage code registers as said plurality of code registers and connected in a ring form, a coefficient setting circuit configured to create the spread code, and a selector connected between said final stage register and a preceding stage register of said final stage register, said selector selecting one of a spread code created by said coefficient setting circuit, data output from said first stage register and data output from said preceding stage register of said final stage register and outputting a selected signal or data to said final stage register.

7. The digital matched filter according to claim 6, further comprising a controller which controls the selecting position of said selector which the code length of the received spread spectrum signal is changed.

8. The digital matched filter according to claim 6, wherein said spread signal storage controller includes a ring shift register which has a plurality of flag registers including first stage to final stage registers, said flag registers storing sequentially shifted flag data and outputting the flag data to said plurality of spread spectrum memories, a flag setting circuit configured to generate flag data, and a selector connected between said final stage register and a preceding stage register of said final stage register, said selector selecting one of flag data created by said flag setting circuit, data output from said first stage register and data output from said preceding stage register of said final stage register and outputting selected data to said final stage register.

9. The digital matched filter according to claim 8, further comprising a controller which controls the selecting state of said selector when the code length of the received spread spectrum signal is changed.

10. The digital matched filter according to claim 6, wherein said adder unit includes a plurality of pre-stage adders each of which adds together the results of multiplication of adjacent two of said multipliers and a rear stage adder which adds together the results of addition of said pre-stage adders to derive the correlation value.

11. The digital matched filter according to claim 1, wherein said spread signal storage controller includes a ring shift register which has a plurality of flag registers including first stage to final stage registers, and which stores sequentially shifted flag data and outputting the flag data to said plurality of spread spectrum memories, a flag setting circuit which generates flag data, and a selector connected between said final stage register and one of said flag registers that immediately precedes said final stage register, said selector selecting one of the flag data created by said flag setting circuit, data output from said first stage register and data output from said preceding stage register of said final stage register and outputting selected data to said final stage register.

12. The digital matched filter according to claim 11, further comprising a controller which controls the selecting state of said selector when the code length of the received spread spectrum signal is changed.

13. The digital matched filter according to claim 11, wherein said adder unit includes a plurality of pre-stage adders each of which adds together the results of multiplication of adjacent two of said multipliers and a rear stage adder which adds together the results of addition of said pre-stage adders to derive the correlation value.

14. The digital matched filter according to claim 1, wherein said adder unit includes a plurality of pre-stage adders each of which adds together the results of multiplication of adjacent two of said multipliers and a rear stage adder which adds together the results of addition of said pre-stage adders to derive the correlation value.

15. A digital matched filter comprising:
  plural stages of spread signal memories which store received spread spectrum signals;
  a flag generator which outputs the flag data to said plural stages of spread signal memories in a present order to sequentially activate said plural states of spread signal memories, the flag generator including a plurality of flag registers, which store flag data, and configured to shift the flag data while skipping selectively at least one of the flag registers in accordance with a code length of the spread spectrum signal;
  a spread code generator including a spread code shift register which shifts the flag data while selectively skipping at least one of the code registers in accordance with a code length of the spread spectrum signal and generates a plurality of spread code items sequentially shifted in association with generation of the flag data;
  a plurality of multipliers corresponding to the spread code data items output from said spread code generator and said plurality of spread signal memories, said multipliers multiplying the spread spectrum signals, stored in said spread signals memories, by the spread code data items; and
  an adder unit configured to add together the results of multiplication by said plurality of multipliers to derive the correlation between the received spread spectrum signal and the need code stored in said shift register.

16. A digital matched filter comprising:

a plurality of spread signal memories each capable of storing a received spread spectrum signal;

a spread signal storage controller including a plurality of flag registers which store flag data, and configured to output the flag data to a selected one of the flag registers in accordance with a code length of the spread spectrum signal and store the spread spectrum signal received in accordance with a given sequence into one of said plurality of spread signal memories;

a spread code shift register including a plurality of code registers, which store spread codes, and configured to output the flag data to a selected one of the code registers in accordance with a code length of the spread spectrum signals;

a plurality of multipliers corresponding to said plurality of spread signal memories and said plurality of code registers of said spread code shift register, said plurality of multipliers multiplying the spread spectrum signals stored in said spread signal memories by the spread codes stored in said code registers; and an adder unit for adding together the results of multiplication by said plurality of multipliers and deriving the correlation between the received spread spectrum signal and the spread code stored in said shift register.

17. A digital matched filter comprising:

plural stages of spread signal memories each capable of storing a received spread spectrum signal;

a flag generator which outputs the flag data to said plural stages of spread signal memories in a preset order to sequentially activate said plural stages of spread signal memories, the spread code generator including a plurality of flag registers, which store flag data, and configured to output the flag data to a selected one of the flag registers in accordance with a code length of the spread spectrum signal;

a spread code generator including a spread code shift register including a plurality of code registers, which store spread codes, and configured to output the flag data to a selected one of the code registers in accordance with a code length of the spread spectrum signal;

a plurality of multipliers corresponding to the spread code data items stored in said plurality of spread code generators and said plurality of spread signal memories, said plurality of multipliers multiplying the spread spectrum signals stored in said spread signal memories by the spread code data items; and an adder unit configured to add together the results of multiplication by said plurality of multipliers to derive the correlation between the received spread spectrum signal and the spread code stored in said shift register.

\* \* \* \* \*

UNITED STATES PATENT AND TRADEMARK OFFICE
CERTIFICATE OF CORRECTION

PATENT NO. : 6,577,676 B1  
DATED : June 10, 2003  
INVENTOR(S) : Hashimoto

It is certified that error appears in the above-identified patent and that said Letters Patent is hereby corrected as shown below:

Column 8,
Line 40, change "flat" to -- flag --.

Column 10,
Line 62, change "signals" to -- signal --.
Line 67, change "need" to -- spread --.

Signed and Sealed this

Twenty-fifth Day of November, 2003

JAMES E. ROGAN
*Director of the United States Patent and Trademark Office*